US00RE34184E

United States Patent [19]

Baird et al.

[11] E Patent Number: Re. 34,184

[45] Reissued Date of Patent: Feb. 23, 1993

[54] RETROFIT COKE OVEN DOOR SEAL

[75] Inventors: Billy C. Baird; William R. Baird, both of Sturgis, Ky.

[73] Assignee: Saturn Machine & Welding Co. Inc., Sturgis, Ky.

[21] Appl. No.: 790,193

[22] Filed: Nov. 7, 1991

Related U.S. Patent Documents

Reissue of:

[64] Patent No.: 4,919,764
Issued: Apr. 24, 1990
Appl. No.: 309,223
Filed: Feb. 13, 1989

[51] Int. Cl.[5] ..... C10B 25/16

[52] U.S. Cl. ..... 202/248; 202/269

[58] Field of Search ..... 202/242, 248, 269; 49/485, 496

[56] References Cited

U.S. PATENT DOCUMENTS

| | | | |
|---|---|---|---|
| 2,744,858 | 5/1956 | Homan | 202/269 |
| 4,016,045 | 4/1977 | Ackeren . | |
| 4,026,769 | 5/1977 | Steimann | 202/248 |
| 4,176,013 | 11/1979 | Garthus et al. | 202/242 |
| 4,186,055 | 1/1980 | Baird et al. | 202/248 |
| 4,426,259 | 1/1984 | Hendrych . | |

FOREIGN PATENT DOCUMENTS

| | | | |
|---|---|---|---|
| 577100 | 6/1959 | Canada | 202/248 |

*Primary Examiner*—Joye L. Woodard
*Attorney, Agent, or Firm*—Wood, Herron & Evans

[57] ABSTRACT

A retrofit coke oven door seal to replace existing coke oven door seals that have become ineffective due to normal use. The retrofit coke oven door seal includes a leaf spring and seal arrangement and a unique mounting structure to enable the existing seal on a coke oven door to be easily removed and replaced by the present invention without modification of alteration to the door body or the existing refractories thus making improvements (in emission control) on existing doors by using a relatively simple structure which is cost effective. The retrofit seal for coke oven doors includes a mounting structure attached to the periphery of the diaphragm plate normally provided on a coke oven door together with fastening devices securing a leaf spring and seal assembly in a manner to enable easy removal and replacement thereof if necessary. The leaf spring and seal assembly includes an angled seal strip of metallic construction and a leaf spring engaging the outer inclined surface thereof to provide a constant sealing pressure to urge the seal strip against the door jamb surface with the angle of the sealing strip providing for elevational flexibility with the angled portion of the seal strip enabling the seal strip to conform with the jamb surface which it engages without requiring the seal strip to maintain any of its original axial planes.

8 Claims, 1 Drawing Sheet

RETROFIT COKE OVEN DOOR SEAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to a coke oven door seal and more specifically to a retrofit coke oven door seal to replace existing coke oven door seals that have become ineffective due to normal use. The retrofit coke oven door seal includes a leaf spring and seal arrangement and a unique mounting structure to enable the existing seal on a coke oven door to be easily removed and replaced by the present invention without modification or alteration to the door body or the existing refractories thus making improvements (in emission control) on existing doors in emission control by using a relatively simple structure which is cost effective. The retrofit seal for coke oven doors includes a mounting structure attached to the periphery of the diaphragm plate normally provided on a coke oven door together with fastening devices securing a leaf spring and seal assembly in a manner to enable easy removal and replacement thereof if necessary. The leaf spring and seal assembly includes an angled seal strip of metallic construction and a leaf spring engaging the outer inclined surface thereof to provide a constant sealing pressure to urge the seal strip against the door jamb surface with the angle of the sealing strip providing for elevational flexibility with the angled portion of the seal strip enabling the seal strip to conform with the jamb surface which it engages without requiring the seal strip to maintain any of its original axial planes.

2. Description of the Prior Art

Coke oven doors are normally provided with a seal strip oriented in perpendicular relation to the door jamb surface with the sealing strip being mounted in a groove in an edge element secured to a diaphragm plate with plungers biasing the sealing strip into sealing engagement with the door jamb. During use, the sealing strip will harden, warp and become ineffective to seal the coke oven door. Existing coke oven door structures and seals provided thereon are known in various prior patents. For example, U.S. Pat. No. 4,016,045 discloses one type of coke oven door and seal. Our prior U.S. Pat. No. 4,186,055 discloses a coke oven door with a leaf spring and seal assembly provided thereon and U.S. Pat. No. 4,426,259 discloses another type of coke oven door seal. Also, the prior patents cited in the above-mentioned patents and discussed in the specification accompanying the above patents also disclose various structural arrangements associated with coke oven doors. Conventional coke oven doors which have a seal strip perpendicular to the door jamb surface as discussed above encounter problems of maintaining an effective seal over a long period of time and are difficult to repair.

SUMMARY OF THE INVENTION

An object of the present invention is to provide a retrofit coke oven door seal specifically adapted for replacing existing, ineffective coke oven door seals of the type having a sealing strip oriented perpendicular to the door jamb surface which it engages with the present invention including an angled leaf spring and seal assembly that replaces the existing seal to provide an effective coke oven door seal which improves the emission control capabilities thereof and can be utilized without alteration of the door body or the existing refractories mounted thereon thus making the improvement to existing doors more effective for emission control capabilities and also simple and cost effective.

A further object of the invention is to provide a retrofit coke oven door seal which can be attached to the diaphragm plate and includes fastening devices to enable easy removal and replacement or repair of the leaf spring and seal assembly including an angled seal and a leaf spring engaging one surface of the angled seal to provide constant sealing pressure to the leaf spring seal thereby providing elevational flexibility to accommodate for warpage without requiring the seal to maintain its original axial plane.

A further object of the invention is to provide a retrofit coke oven door seal in accordance with the preceding objects in which the conventional gaskets used in existing seals which become brittle, crack and deteriorate are replaced by steel sealing rings which form a lasting, positive and gas tight seal.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
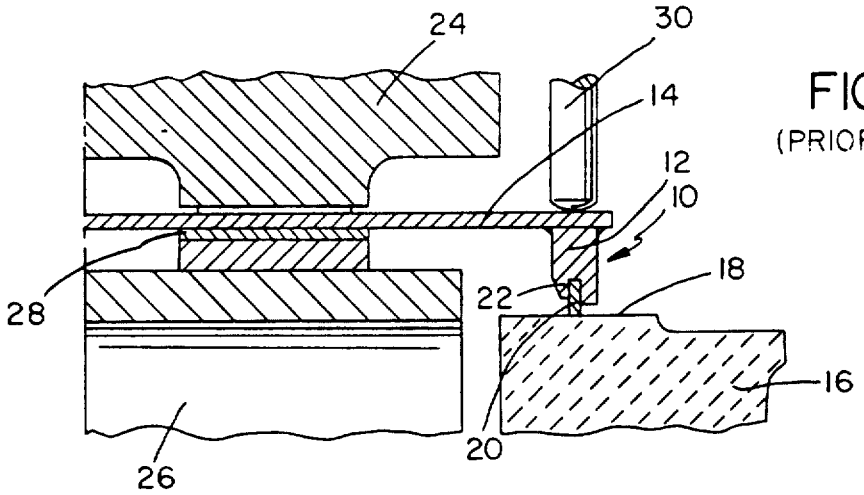
FIG. 1 (PRIOR ART)
FIG. 1 is a fragmental sectional view of a conventional coke oven door and seal which is to be replaced by the present invention.

Referring to FIG. 1, a coke oven door seal of the prior art is illustrated and generally designated by reference numeral 10 which includes an edge element or flange 12 secured to a diaphragm plate 14 and extending toward the door jamb 16. The door jamb 16 includes a door jamb surface 18 engaged by a thin sealing strip 20 that is perpendicular to the door jamb surface 18 and received in a groove 22 in the edge element 12. The diaphragm plate 14 is supported from the coke oven door body 24 and refractory elements 26 are supported from the coke oven door by the use of fastening devices and gaskets 28. A plurality of plungers 30 spaced four to eight inches apart around the periphery of the diaphragm plate 14 are utilized to provide sealing pressure to the sealing strip 20 with the plungers being actuated by a structure well known in this art. The structure illustrated in FIG. 1 is typical of conventional coke oven door seal arrangements and, during use, the sealing strip becomes ineffective due to high temperatures, excessive pressures, warpage and general deterioration so that the axial plane of the sealing strip 20 becomes angulated in relation to the surface 18 and the surface 18 has deposits formed thereon all of which render the coke oven door seal somewhat ineffective to seal the coke oven and maintain coke oven gases therein. Problems relating to coke oven doors and the seals therefor have been discussed in the various prior patents mentioned previously. As indicated previously, various efforts have been made to provide improved seals for new construction of coke oven doors. However, the problems still exist with conventional and existing coke oven doors which have seal arrangements the same as or similar to that illustrated in FIG. 1 which, as indicated previously, represents typical prior art structure.

Figure 2:
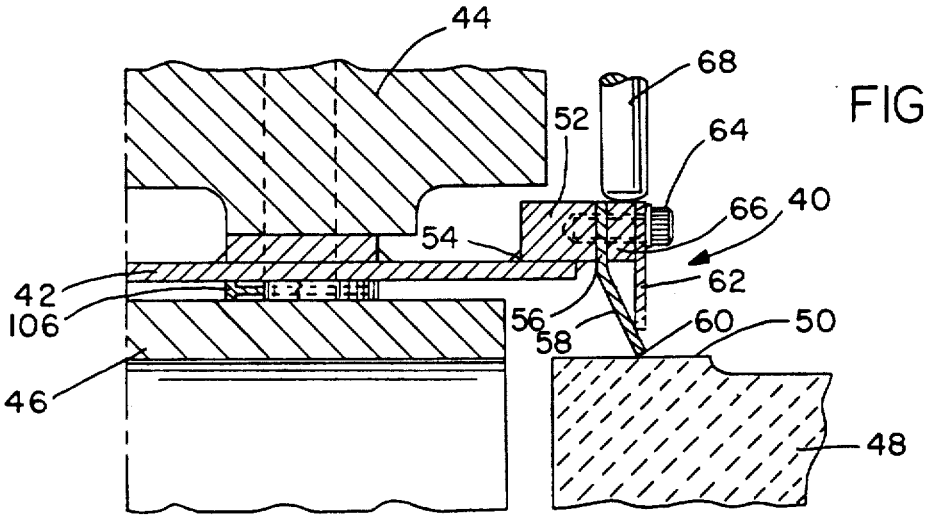
FIG. 2 is a sectional view similar to FIG. 1 but illustrating one embodiment of the retrofit coke oven door seal of this invention.

FIG. 2 illustrates the retrofit coke oven door seal of the present invention generally designated by numeral 40 and which includes the usual diaphragm plate 42 supported from the door body 44 and provided with a plurality of refractories 46 associated with the door body 44. The seal 40 engages the door jamb 48 which has a surface 50 that is substantially planar and defines the opening closed by the coke oven door.

The periphery of the diaphragm plate 42 is provided with an edge element or flange 52 secured to the outer surface thereof as by welding 54. Attached to the edge element 52 is a seal 56 having an angled edge portion 58 terminating in a free edge 60 with the angled portion 58 providing angle contact of the seal strip 56 with the door jamb surface 50. A pressure leaf spring 62 engages the outer inclined surface of the angled portion 58 of the seal 56 as illustrated in FIG. 2 to provide constant spring pressure against the seal 56. A fastener bolt 64 extends through the spring 62 and seal 56 and a spacer bar 66 positioned therebetween with the outer surfaces of the edge element 52, spacer bar 66 and the end edges of the spring 62 and seal 56 all being flush for engagement with the existing plungers 68 which have not been altered from the plungers 30 illustrated in FIG. 1. Accordingly, with this construction, the leaf spring seal assembly 40 is removably attached to the edge element 52 rigidly affixed to the diaphragm plate 42 with the fasteners 64 enabling easy removal and replacement of the components of the seal assembly when desired.

Figure 3:
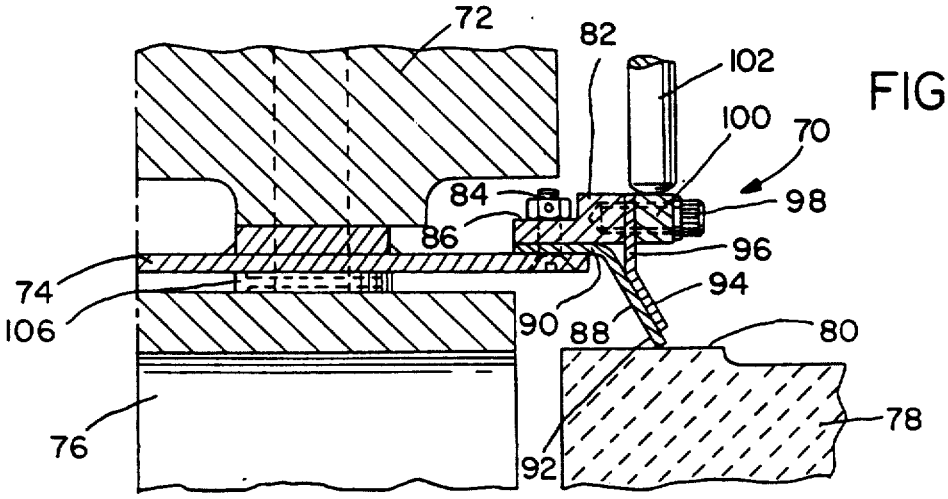
FIG. 3 is a sectional view similar to FIG. 2 and illustrating another embodiment of the retrofit coke oven door seal of this invention.

FIG. 3 illustrates another embodiment of the seal generally designated by reference numeral 70 in which the components are the same insofar as the door body 72, diaphragm plate 74, refractories 76, door jamb 78 and door jamb surface 80 is concerned. In this embodiment, a mounting bar or edge element 82 is secured to the edge of the diaphragm plate 74 by bolt-type fasteners 84 which extend through the diaphragm plate and the edge element 82 with the portion of the edge element 82 receiving fasteners 84 being recessed as at 86. The seal assembly 70 includes a seal 88 having a horizontal flange 90 interposed between the outer surface of the diaphragm plate and the edge element 82 and secured in place by the fastening bolts 85. The downwardly angled portion 92 of the seal 88 is angled in relation to the door jamb surface in the same manner as the structure illustrated in FIG. 2. A pressure leaf spring 94 engages the outer inclined surface of the angled portion 92 to provide constant spring pressure to the seal 88. The leaf spring 94 includes a vertical portion 96 which extends along the outer surface of the edge element and is secured thereto by fastening bolts 98 which extend through a securing bar or spacer bar 100 and into the edge element 82 with the upper surface of the spacer bar 100, the upper edge of the leaf spring 94 and the upper surface of the edge element 82 all being flush with each other to provide a surface for engagement by the plunger 102 which is the same as the plungers 68 and 30 as illustrated in FIG. 2 and 1, respectively.

In each of the embodiments illustrated in FIGS. 2 and 3, the gasket 28 as indicated in FIG. 1 between the diaphragm plate and the refractories has been replaced by the use of a steel sealing ring 106 associated with the refractories thereby providing a lasting, positive, gas tight seal which replaces a gasket 28 used in the existing seal arrangement which becomes brittle and sometimes cracks and deteriorates in use which enables gas leakage in some instances.

The novel seal assembly 40 or 70 enables the removal of the leaf springs to enable the seal to be repaired if physically damaged without detaching the seal from the door body. While extensive damage may require removal and possible replacement of the seal as illustrated in FIGS. 2 and 3, the ability to make minor repairs to this seal, while in place, makes this seal cost effective compared to existing seal structures when considering maintenance requirements and also provides a cost effective seal which improves emission control capabilities.

The seal strip 20 illustrated in FIG. 1 is perpendicular to the jamb surface 18 which renders adequate elevational adjustment very difficult if not impossible especially when the jamb surface has become warped or deposits have formed thereon. Even though pressure is applied by the plungers 30 at four to eight inch spacings around the door, the flexibility of the seal strip 20 is restricted in that the seal strip is required to flex while maintaining the plane of its longitudinal axis. In comparison, the replacement seal 40 or 70 provides an angle engagement with the jamb surface thereby allowing elevational flexibility without requiring the seal to maintain its original axial plane. In both instances, basic sealing pressure is applied to the seal through the existing plungers while continual pressure is maintained throughout the length of the seal spring by the leaf springs 62 and 94.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A retrofit coke oven door seal assembly in combination with a coke oven door having a diaphragm plate supported from a door body, said plate having an interior surface with refractories supported therefrom and a peripheral edge, said seal assembly comprising a support member mounted peripherally around the peripheral edge of the diaphragm plate, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure leaf spring including an edge engaging the outer surface of the angled portion of the seal to provide continual pressure against the angled portion of the seal, said coke oven door including plungers engaging the seal assembly and providing pressure against the seal assembly, said pressure leaf spring being straight throughout its length and width, said seal and pressure leaf spring having parallel opposed surfaces spaced from each other, a spacer bar positioned between and engaged with the opposed surfaces on said seal and pressure leaf spring, and fastener bolts extending through the seal, pressure leaf spring and spacer bar into the support member to removably secure the seal, pressure leaf spring and spacer bar to the support member.

2. A retrofit coke oven door seal assembly in combination with a coke oven door having a diaphragm plate supported from a door body, said plate having an interior surface with refractories supported therefrom and a peripheral edge, said seal assembly comprising a support member mounted peripherally around the peripheral edge of the diaphragm plate, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure leaf spring including an edge engaging the outer surface of the angled portion of the seal to provide continual pressure against the angled portion of the seal, said coke oven door including plungers engaging the seal assembly and providing pressure against the seal assembly, said pressure leaf spring including an angulated portion in surface-to-surface engagement with the outer surface of the angled portion of the seal, said seal including a mounting portion engaged with the interior surface of the diaphragm plate, said support member engaging the mounting portion of the seal, first fastener bolts extending through the diaphragm plate, mounting portion of the seal and support member, said pressure leaf spring including a mounting portion engaging said support member, a spacer bar engaging the mounting portion of the pressure leaf spring in opposed relation to the support member and second fastener bolts extending through the spacer bar, mounting portion of the pressure leaf spring and threaded into the support member to enable removal of the seal assembly.

3. A retrofit coke oven door seal assembly in combination with a coke oven door having a diaphragm plate supported from a door body, said plate having an interior surface with refractories supported therefrom and a peripheral edge, said seal assembly comprising a support member mounted peripherally around the peripheral edge of the diaphragm plate, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure leaf spring including an edge engaging the outer surface of the angled portion of the seal to provide continual pressure against the angled portion of the seal, said coke oven door including plungers engaging the seal assembly and providing pressure against the seal assembly, and a metallic ring seal interposed between the diaphragm plate and refractories to provide a lasting, positive, gas tight seal.

*4. A retrofit coke oven door seal assembly in combination with a coke oven door having a diaphragm plate supported from a door body, said plate having an interior surface with refractories supported therefrom and a peripheral edge, said seal assembly comprising a support member mounted peripherally around the peripheral edge of the diaphragm plate, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure leaf spring including an edge engaging the outer surface of the angled portion of the seal to provide continual pressure against the angled portion of the seal, said pressure leaf spring being straight throughout its length and width, said seal and pressure leaf spring having parallel opposed surfaces spaced from each other, a spacer bar positioned between and engaged with the opposed surfaces on said seal and pressure leaf spring, and fastener bolts extending through the seal, pressure leaf spring and spacer bar into the support member to removably secure the seal, pressure leaf spring and spacer bar to the support member.*

*5. A retrofit coke oven door seal assembly in combination with a coke oven door having a diaphragm plate supported from a door body, said plate having an interior surface with refractories supported therefrom and a peripheral edge, said seal assembly comprising a support member mounted peripherally around the peripheral edge of the diaphragm plate, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure leaf spring including an angulated portion in surface-to-surface engagement with the outer surface of the angled portion of the seal to provide continual pressure against the angled portion of the seal, said seal including a mounting portion engaged with the interior surface of the diaphragm plate, said support member engaging the mounting portion of the seal, first fastener bolts extending through the diaphragm plate, mounting portion of the seal and support member, said pressure leaf spring including a mounting portion engaging said support member, a spacer bar engaging the mounting portion of the pressure leaf spring in opposed relation to the support member and second fastener bolts extending through the spacer bar, mounting portion of the pressure leaf spring and threaded into the support member to enable removal of the seal assembly.*

*6. A retrofit coke oven door seal assembly in combination with a coke oven door having a diaphragm plate supported from a door body, said plate having an interior surface with refractories supported therefrom and a peripheral edge, said seal assembly comprising a support member mounted peripherally around the peripheral edge of the diaphragm plate, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure*

*leaf spring including an edge engaging the outer surface of the angled portion of the seal to provide continual pressure against the angled portion of the seal, and a metallic ring seal interposed between the diaphragm plate and refractories to provide a lasting, positive, gas-tight seal.*

*7. A retrofit coke oven door seal assembly adapted to be used with a coke oven door comprising a support member adapted to be mounted peripherally around a peripheral edge of a coke oven door, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure leaf spring including an edge engaging the outer surface of the angled portion of the seal to provide continual pressure against the angled portion of the seal, said pressure leaf spring being straight throughout its length and width, said seal and pressure leaf spring having parallel opposed surfaces spaced from each other, a spacer bar positioned between and engaged with the opposed surfaces on said seal and pressure leaf spring, and fastener bolts extending through the seal, pressure leaf spring and spacer bar into the support member to removably secure the seal, pressure leaf spring and spacer bar to the support member.*

*8. A retrofit coke oven door seal assembly adapted to be used with a coke oven door comprising a support member adapted to be mounted peripherally around a peripheral edge of a coke oven door, a pressure leaf spring and a seal attached to the support member for engagement with a door jamb surface peripherally of the coke oven door, said seal including an angled portion for engaging a door jamb surface in angular relation to enable flexing of the angled portion without maintaining the plane of the angled portion while maintaining sealing engagement with a door jamb, said angled portion including an inclined outer surface, said pressure leaf spring including an angulated portion in surface-to-surface engagement with the outer surface of the angled portion of the seal to provide continual pressure against the angled portion of the seal, said seal including a mounting portion engaged with the support member, first fastener bolts extending through the mounting portion of the seal and support member, said pressure leaf spring including a mounting portion engaging said support member, a spacer bar engaging the mounting portion of the pressure leaf spring in opposed relation to the support member, and second fastener bolts extending through the spacer bar and mounting portion of the pressure leaf spring and into the support member to enable removal of the seal assembly.*

* * * * *